US011980582B1

(12) United States Patent
Wang et al.

(10) Patent No.: US 11,980,582 B1
(45) Date of Patent: May 14, 2024

(54) ROTARY MASTURBATION APPARATUS

(71) Applicant: Junpeng Wu, Shenzhen (CN)

(72) Inventors: Qinling Wang, Guangdong (CN); Junpeng Wu, Shenzhen (CN)

(73) Assignee: Junpeng Wu, Shenzhen (CN)

( * ) Notice: Subject to any disclaimer, the term of this patent is extended or adjusted under 35 U.S.C. 154(b) by 0 days.

(21) Appl. No.: 18/121,580

(22) Filed: Mar. 14, 2023

(30) Foreign Application Priority Data

Feb. 23, 2023 (CN) ......................... 202320321278.3

(51) Int. Cl.
*A61H 19/00* (2006.01)

(52) U.S. Cl.
CPC ....... *A61H 19/32* (2013.01); *A61H 2205/087* (2013.01)

(58) Field of Classification Search
CPC .......................... A61H 19/32; A61H 2205/087
See application file for complete search history.

(56) References Cited

U.S. PATENT DOCUMENTS

2010/0121234 A1* 5/2010 Nan ....................... A61H 19/44 601/134
2020/0178943 A1* 6/2020 Nakamura ............. A61H 19/32
2023/0084853 A1* 3/2023 Raju ...................... A61H 19/32 600/38

FOREIGN PATENT DOCUMENTS

CN 111773058 A * 10/2020
CN 112545573 A * 3/2021 ......... A61B 10/0058
TW M399712 U * 3/2011

* cited by examiner

*Primary Examiner* — Kaylee R Wilson

(57) ABSTRACT

A rotary masturbation apparatus includes a cup holder, a cup body and a conductive structure arranged between the cup holder and the cup body. The cup body is rotatably connected to the cup holder, and defines an inner chamber therein for accommodating the male genitalia. The conductive structure includes a first conductive element and a second conductive element which are in contact with each other and are electrically conducted with each other. The first conductive element is fixed relative to the cup holder, and the second conductive element is fixed relative to the cup body. One of the first and second conductive elements is configured as a conductive ring, and the conductive ring is coaxial with the cup body.

8 Claims, 10 Drawing Sheets

ROTARY MASTURBATION APPARATUS

CROSS-REFERENCE TO RELATED APPLICATIONS

This application claims priority to Chinese Patent Application No. 202320321278.3 filed on Feb. 23, 2023, the entire contents of which are hereby incorporated by reference.

TECHNICAL FIELD

The present application relates to the technical field of masturbation apparatus, more particularly relates to a rotary masturbation apparatus.

BACKGROUND

Masturbation cup is a tool for simulating the female vaginal to allow males, particularly the bachelordom and long-distance separation males, to release their sex pressure, which satisfy their physiological and psychological needs to a certain extent.

Generally, the masturbation cup includes a cup holder and a cup body connected to the cup holder. Control members, such as control circuit board and the like, are accommodated in the cup holder; and functional members, such as vibration motor and etc., are accommodated in the cup body and electrically connected to the functional members by wires. The cup holder provides an inner chamber for simulating the female vaginal. During the sexual intercourse, the male genitalia is inserted in the inner chamber, and the cup body moves relative to the cup holder under the control of the controllers to provide suitable stimulation to the male genitalia.

However, such constructions are not suitable for the rotary masturbation cup, because the rotation of the cup body relative to the cup holder will cause damage to the wire, making the functional members in the cup body that need to be powered useless.

SUMMARY

An object of the present application is to provide a rotary masturbation apparatus which is capable of effectively solving the electrical connection between the cup body and the cup holder.

In order to achieve the above-mentioned object, the present application provides a rotary masturbation apparatus, including: a cup holder; a cup body being rotatably connected to the cup holder, the cup body defining an inner chamber therein for accommodating the male genitalia; and a conductive structure being arranged between the cup holder and the cup body, the conductive structure including a first conductive element and a second conductive element which are in contact with each other and are electrically conducted with each other, the first conductive element being fixed relative to the cup holder, the second conductive element being fixed relative to the cup body, one of the first and second conductive elements being configured as a conductive ring, and the conductive ring being coaxial with the cup body.

In some embodiments, the one of the first and second conductive elements comprises a plurality of conductive rings, and the conductive rings are arranged at intervals in the radial direction or the axial direction.

In some embodiments, the other one of the first and second conductive elements comprises a plurality of conductive pins or conductive strips, the number of the conductive pins or conductive strips is the same as that of the conductive rings, and each of conductive pins or conductive strips abut one of the conductive rings.

In some embodiments, the conductive rings are arranged at intervals in the radial direction, and the conductive pins or conductive strips abut the conductive rings axially; or the conductive rings are arranged at intervals in the axial direction, and the conductive pins or conductive strips abut the conductive rings radially.

In some embodiments, a rotary motor is arranged inside the cup holder with a rotary shaft thereof in transmission connection with the cup body; the first conductive elements are conductive pins or conductive strips, and are fixed in the cup holder; and the second conductive elements are conductive rings, and are fixedly mounted around the rotary shaft and arranged at intervals in the axial direction.

In some embodiments, a rotary motor is arranged inside the cup holder with a rotary shaft thereof in transmission connection with the cup body; the first conductive elements are conductive rings, and are fixed in the cup holder and arranged around the rotary shaft at intervals in the radial direction; and the second conductive elements are conductive pins or conductive strips, and are fixed in the cup body.

In some embodiments, the rotary shaft of the rotary motor is conductive and acts as one of the conductive rings.

In some embodiments, the motor housing of the rotary motor is conductive, one end of the rotary shaft abuts one of the conductive pins or conductive strips to form electrical conduction therebetween, and the other end of the rotary shaft contacts the motor housing to form electrical conduction therebetween.

In some embodiments, a conductive terminal protrudes outwardly from the motor housing.

In some embodiments, the conductive rings are connected to an end of the cup holder facing the cup body through a fixing frame which defines a plurality of annular grooves, and each of the conductive rings is received in one of the annular grooves.

In some embodiments, a position slot concaves from a bottom of each of the annular grooves, and each of the conductive rings comprises a position tab extending into the corresponding position slot.

In some embodiments, at least a functional member is arranged in the cup body and electrically connected to the second conductive element; the number of the functional member is N, and the number of the conductive rings is N+1, wherein N is an integer greater than zero.

In some embodiments, the number of the functional member is at least two, the positive poles of the functional members are electrically connected to different conductive rings, respectively, and the negative poles of the functional members are electrically connected to the same conductive ring.

In some embodiments, the functional members are vibration motor and/or electric heater, and a controller is arranged in the cup holder and electrically connected to the first conductive element for controlling the operation of the functional members.

In some embodiments, at least a functional button is provided on the cup holder and electrically connected to the controller.

Compared with the prior art, the rotary masturbation apparatus provided by the embodiments of the present application has the following beneficial effects: by means of the conductive ring of the conductive structure, the first conductive element and the second conductive element are capable of maintaining the contact and conductive state therebetween, and in turn maintaining the electrical connection between the cup body and the cup holder which are rotate with respect to each other, so that various functional members may be arranged in the cup body to improve the use experience, which is conducive to the development and promotion of the rotary masturbation apparatus.

BRIEF DESCRIPTION OF THE DRAWINGS

In order to illustrate technical solutions of embodiments of the present application more clearly, drawings that need to be used in the description of the embodiments will be briefly described below. It is obvious that the drawings described below are only some embodiments of the present application, and other drawings may be obtained from the drawings without any creative work to those skilled in the art, which should be in the scope of this application. In the following description, the same reference numerals refer to the same members.

Figure 1:
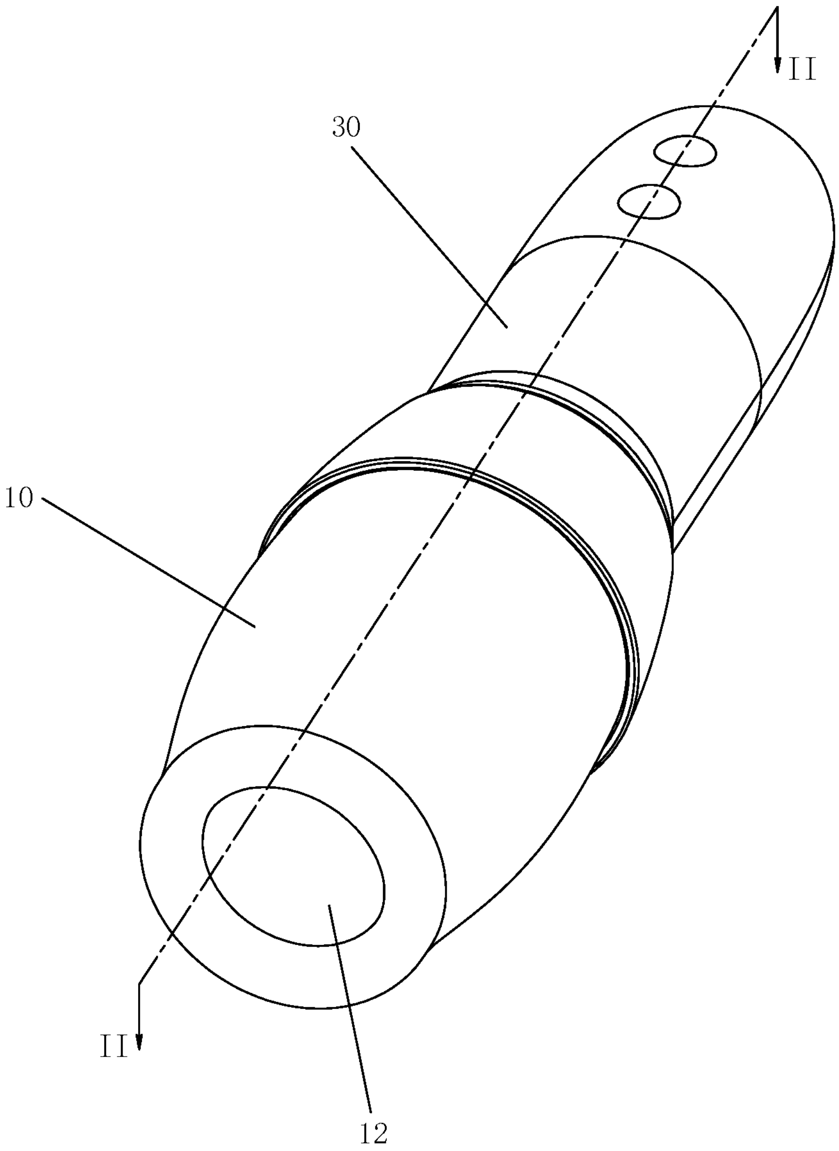
FIG. 1 is a schematic, assembled view of a rotary masturbation apparatus according to an embodiment of the present application.

LIST OF REFERENCE NUMERALS cup body 10
inner chamber 12
sleeve 14
sliding block 141
latching hole 143
functional member 16;
connecting member 20
axial hole 22
sliding groove 24
latching gook 26;
cup holder 30
rotary motor 32
motor housing 33
conductive terminal 331
rotary shaft 34
controller 36
functional button 38
battery 39
conductive structure 40
first conductive element 42
position tab 43
second conductive element 44
support frame 46
fixing frame 48
annular groove 481
position slot 483

DESCRIPTION OF THE EMBODIMENTS

For better illustrating the technical means, creative features, objects and effects of the present application, detailed description will be given for the embodiments provided by the present application with reference to the append drawings. Obviously, the described embodiments are only a part of the embodiments, and not all of the embodiments of the present application. Based on the embodiments of the present application, all other embodiments obtained by those skilled in the art without any creative work should be in the scope of this application.

It should be noted that when an element is referred to as being "fixed to" or "disposed in/at" another element, it may be directly or indirectly on the other element. When an element is referred to as being "connected to" another element, it may be directly or indirectly connected to the other element.

It should be understood that oriental or positional relationships indicated by terms "length", "width", "upper", "lower", "front", "rear", "left", "right", "vertical", "horizontal", "top", "bottom", "inner", "outer" and the like are only intended to facilitate the description of the present application and simplify the description based on oriental or positional relationships shown in the accompanying drawings, not to indicate or imply that the apparatus or element referred must have a specific orientation, is constructed and operated in a specific orientation, and therefore cannot be understood as a limitation of the present application.

In addition, terms "first" and "second" are only used for descriptive purposes, and cannot be understood as indicating or implying relative importance or implicitly indicating the number of technical features indicated. Therefore, features defined with "first" and "second" may explicitly or implicitly include one or more of these features. In the description of the present application, "a plurality of" refers to two or more than two, unless otherwise particularly defined.

Referring to FIGS. 1-6, a rotary masturbation apparatus according to an embodiment of the present application is shown. The rotary masturbation apparatus includes a cup body 10 and a cup holder 30 which are rotatably connected together. The cup body 10 defines an inner chamber 12 in an end thereof far away from the cup body 10 for simulating the female vaginal. During the sexual intercourse, the male genitalia is inserted in the inner chamber 12, and the cup body 10 rotates relative to the male genitalia received therein to provide friction stimulation of 360-degrees, thereby helping the users to release their sex pressure and satisfy their physiological and psychological needs.

Figure 3:
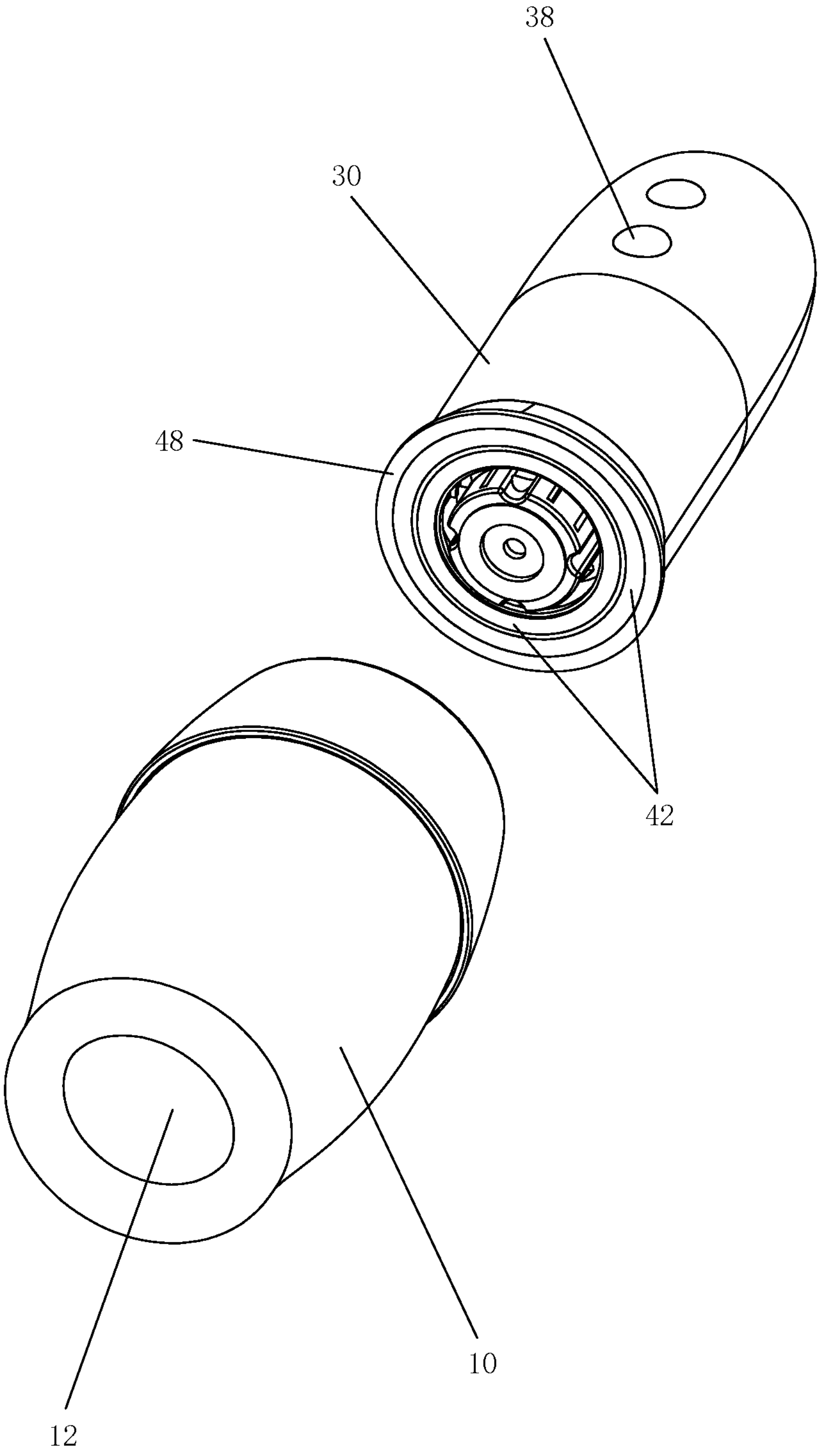
FIG. 3 is a schematic, exploded view of the rotary masturbation apparatus of FIG. 1.
Figure 4:
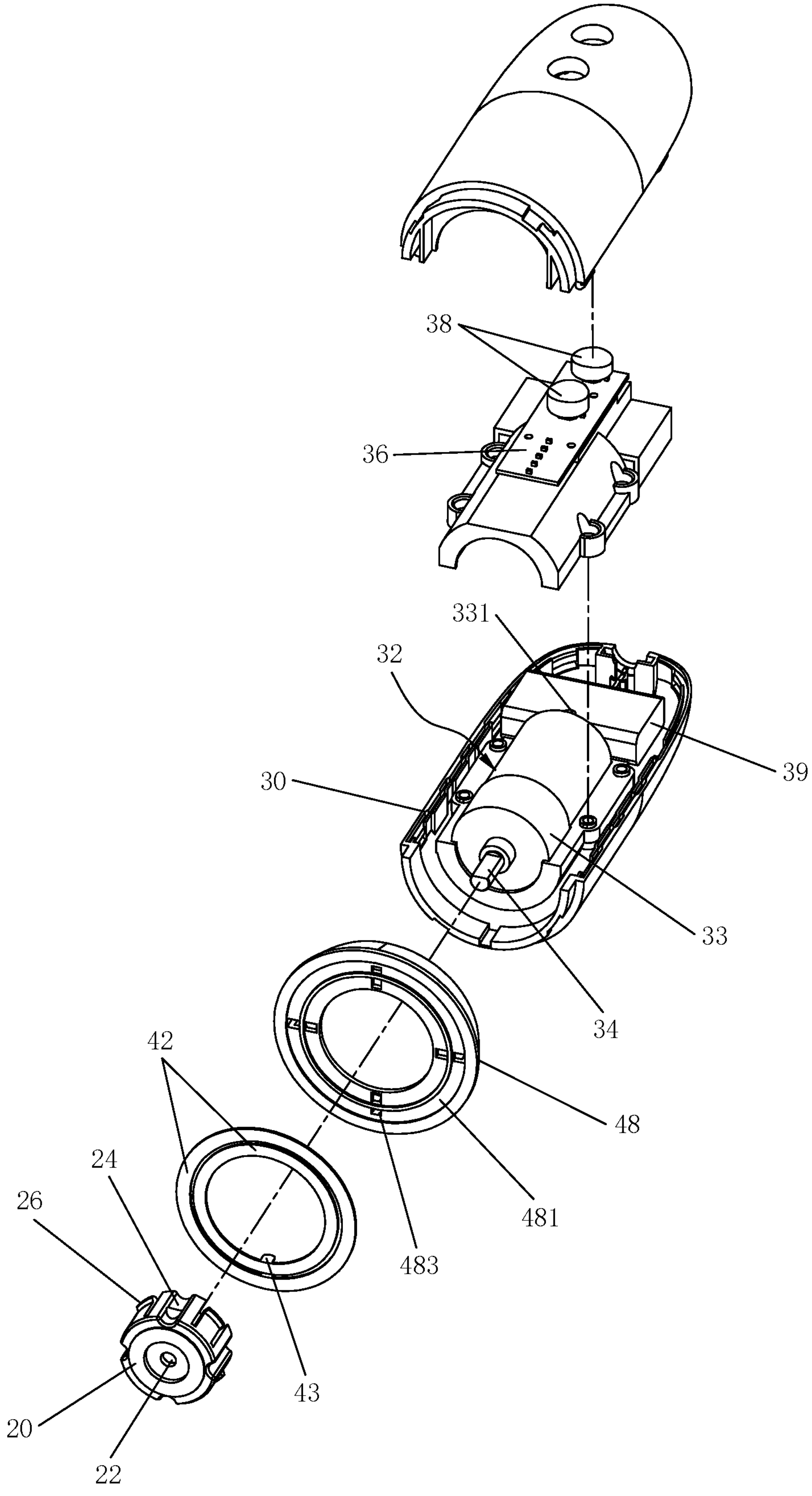
FIG. 4 is an exploded view of a cup holder shown in FIG. 3.

Referring to FIG. 3 and FIG. 4, the rotary masturbation apparatus in this embodiment is constructed as an electric device. A rotary motor 32 is mounted in the cup holder 30 with a rotary shaft 34 thereof in transmission connection with the cup body 10 through a connecting member 20. Specifically, an axial hole 22 is defined in a central portion of the connecting member 20 for extending of the rotary shaft 34 therethrough. Preferably, cross sections of the rotary shaft 34 and the axial hole 22 both are non-circular, for example, both are generally "D" shaped. The assembled connecting member 20 and the rotary shaft 34 cooperatively form a limitation in a circumferential direction, so that the connecting member 20 is capable of rotating along with the rotary shaft 34.

In other embodiments, relative rotation between the connecting member 20 and the rotary shaft 34 may be limited by other ways, such as by shaft key and keyway. Specifically, a keyway is defined in one of an outer wall of the rotary shaft 34 and an inner wall of the connecting member 20, and a shaft key is provided on the other one of the outer wall of the rotary shaft 34 and the inner wall of the connecting member 20. The shaft key is engaged in the keyway to prohibit relative rotation between the connecting member 20 and the rotary shaft 34 in the circumferential direction.

Figure 5:
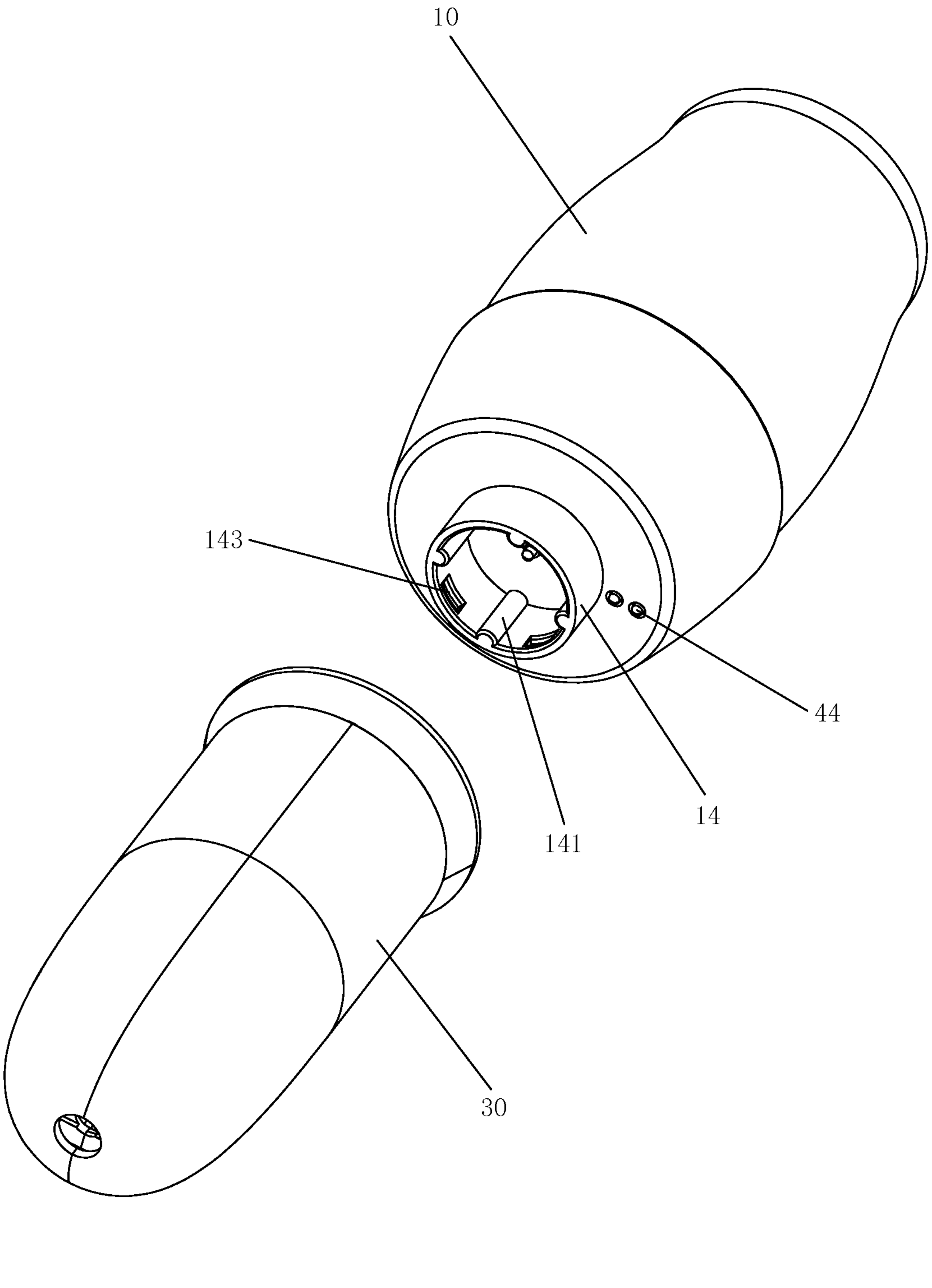
FIG. 5 is a schematic, exploded view of the rotary masturbation apparatus from another aspect.
Figure 6:
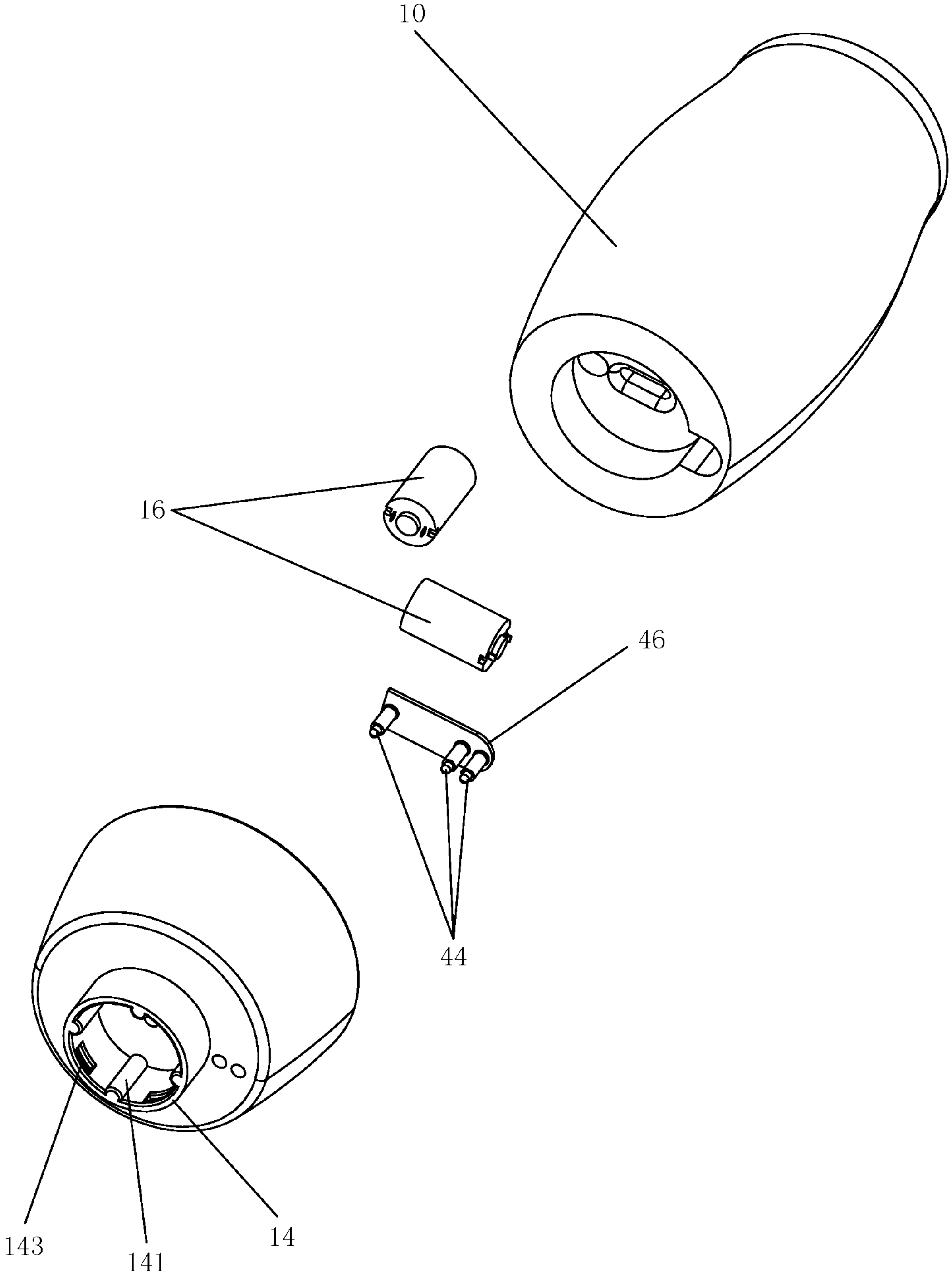
FIG. 6 is an exploded view of a cup body shown in FIG. 5.
Figure 7:
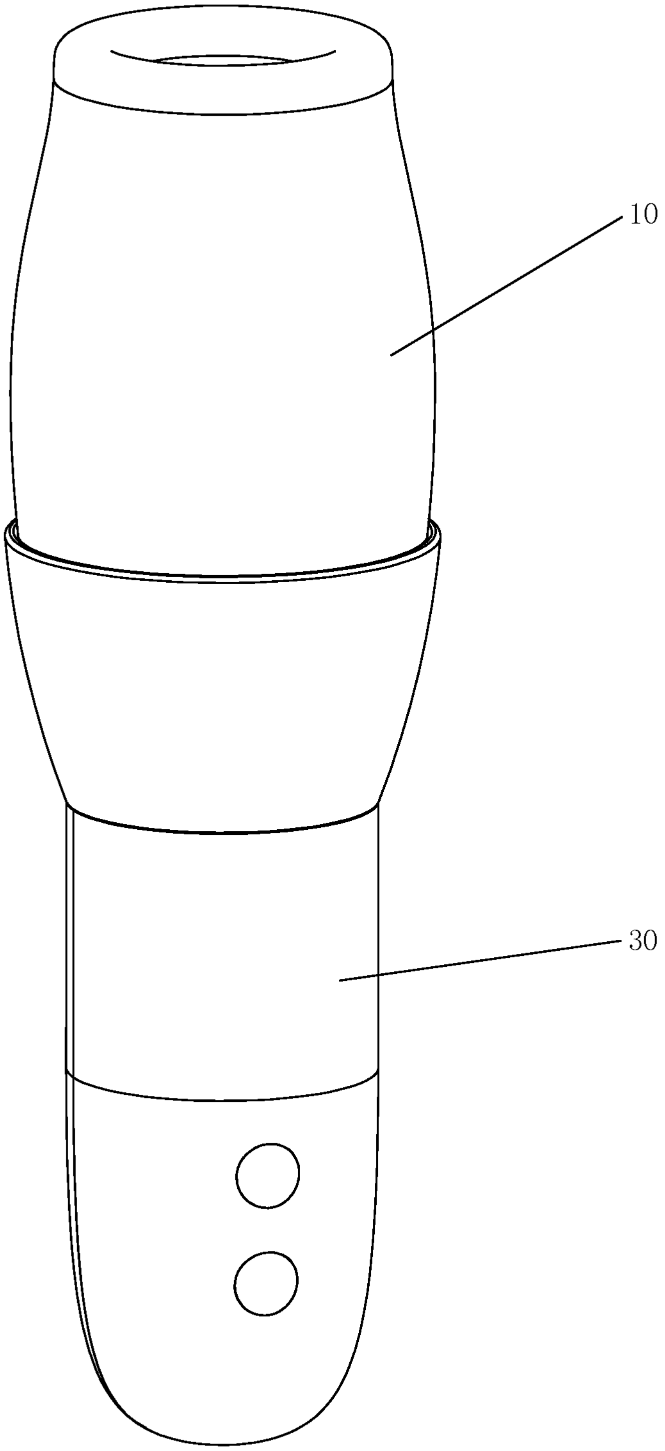
FIG. 7 is a schematic, assembled view of a rotary masturbation apparatus according to another embodiment of the present application.
Figure 8:
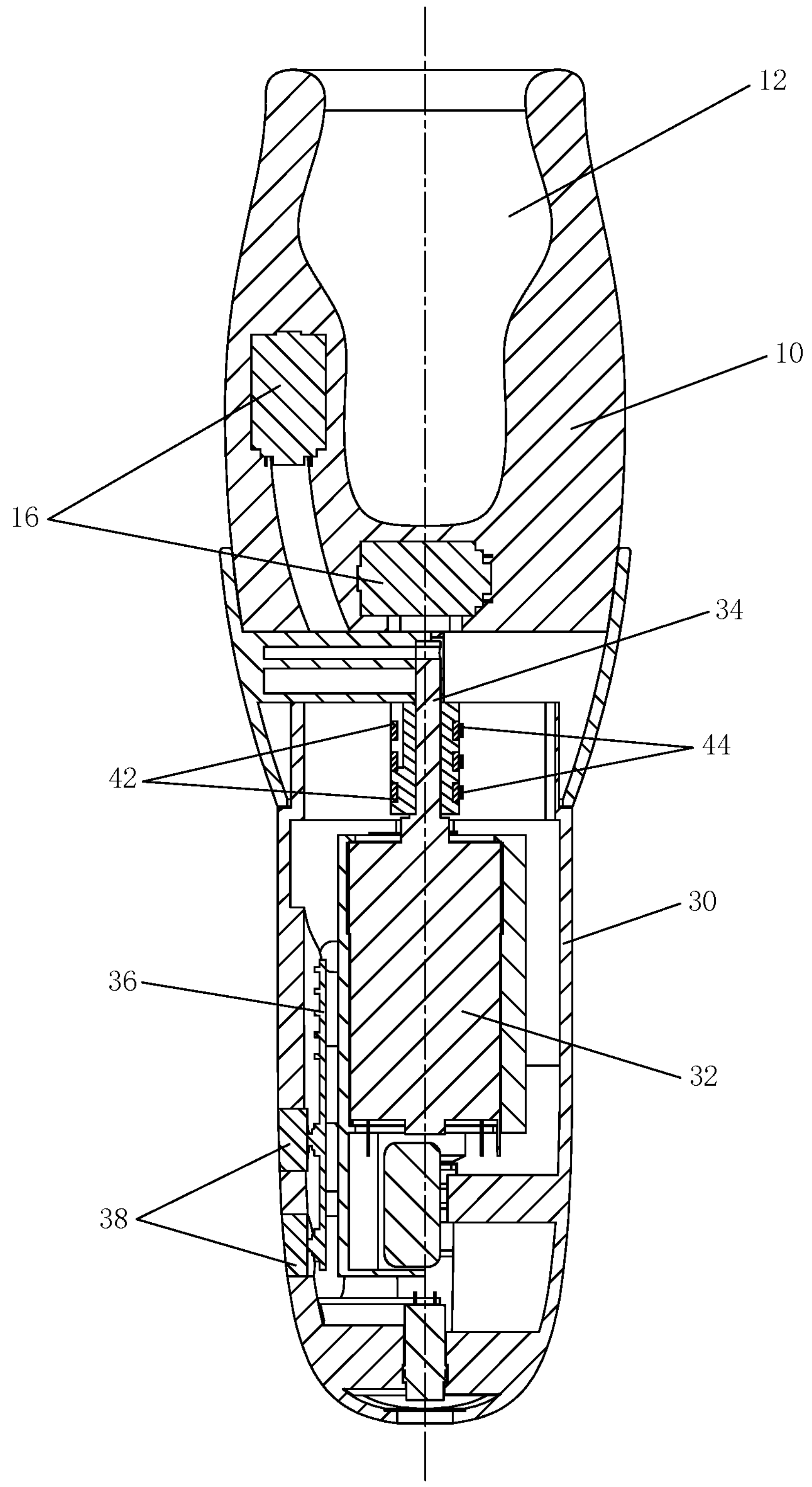
FIG. 8 is a cross sectional view of the rotary masturbation apparatus of FIG. 7.
Figure 9:
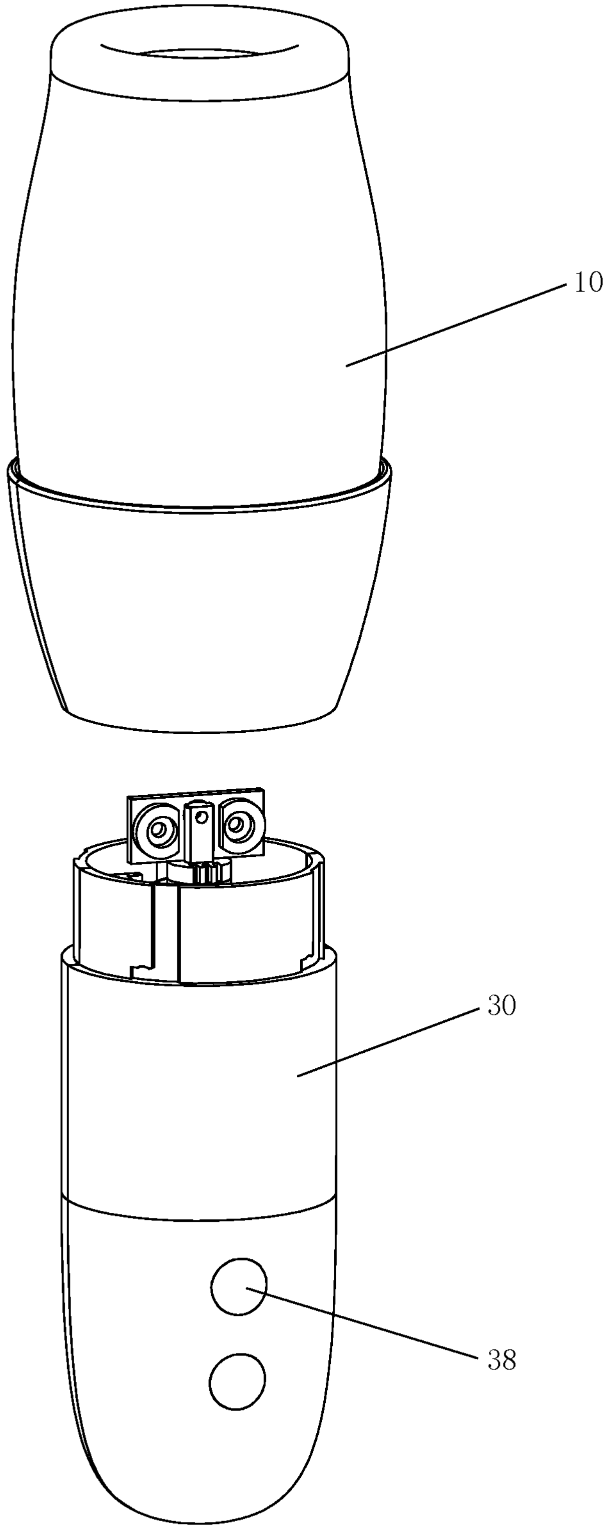
FIG. 9 is a schematic, exploded view of the rotary masturbation apparatus of FIG. 7.
Figure 10:
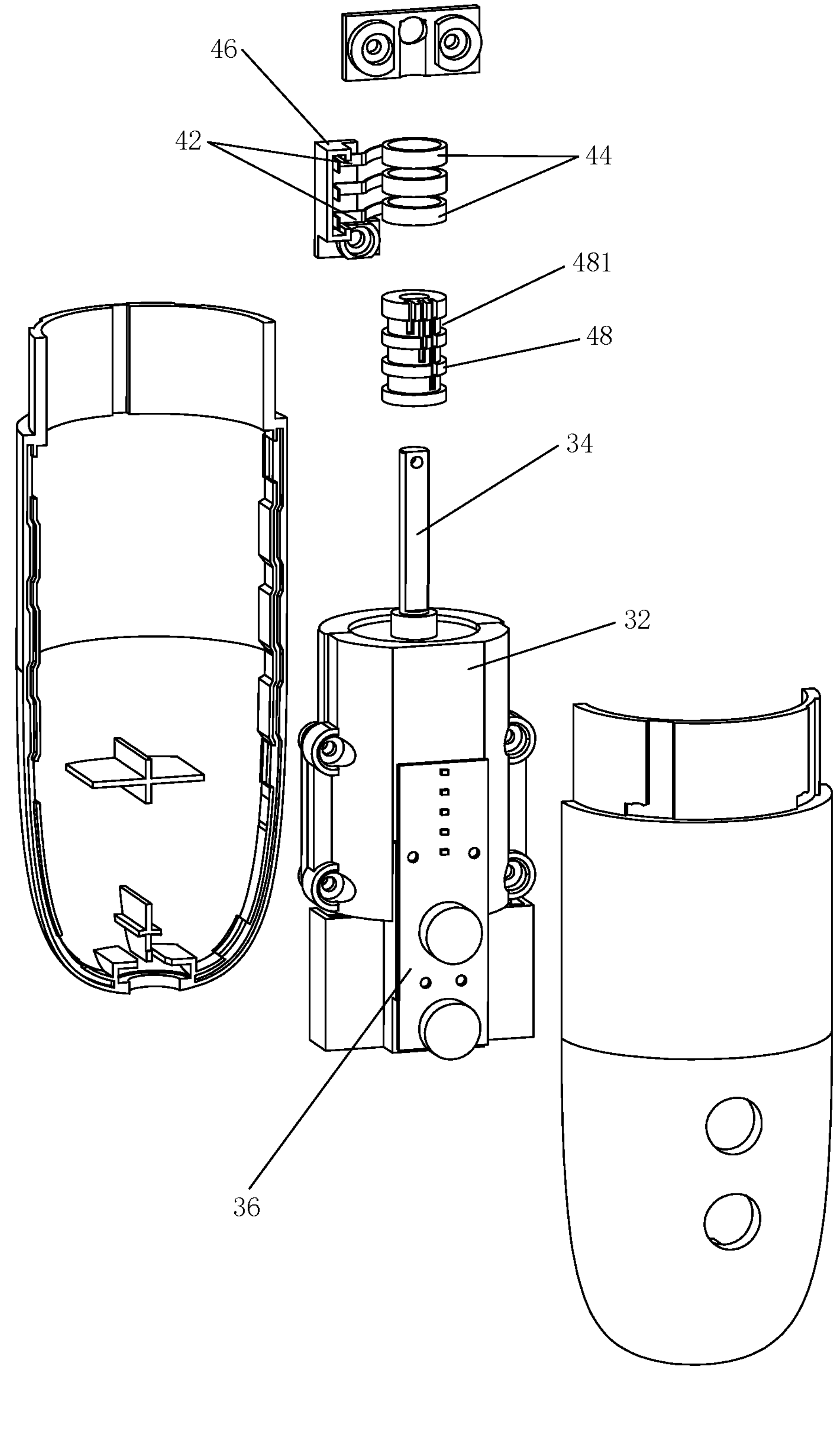
FIG. 10 is an exploded view of the cup holder shown in FIG. 9.

Referring to FIGS. 4-6, a sleeve 14 extends outwardly from a central portion of an end of the cup body 10 towards the cup holder 30 for connecting the connecting member 20. Preferably, an outer circumferential surface of the connecting member 20 is concaved to form a plurality of sliding grooves 24 which extends axially, and a plurality of sliding blocks 141 corresponding to the sliding groove 24 protrudes outwardly from an inner circumferential surface of the sleeve 14. During assembly, the sleeve 14 is mounted around the connecting member 20 with each sliding block 141 thereof sliding into one corresponding sliding groove 24. By means of the sliding grooves 24 and the sliding blocks 141, the sleeve 14 and the connecting member 20 are aligned more accurately.

Referring to FIG. 5, a plurality of latching hooks 26 are formed on the outer circumferential surface of the connecting member 20, and a plurality of latching holes 143 corresponding to the latching hooks 26 are defined in the inner circumferential surface of the sleeve 14. During assembly of the sleeve 14 and the connecting member 20, each latching hook 26 generates a slightly deformation and then engages into one corresponding latching hole 143. The latching hooks 26 engaged in the latching holes 143 recovery deformation to fix the sleeve 14 to the connecting member 20 through the concave-convex fit. In this way, the cup body 10 is fixedly connected to the rotary shaft 34 of the rotary motor 32, and the cup body 10 is capable of rotating along with the rotary shaft 34.

In some embodiments, the rotary masturbation apparatus may also be constructed as a manual device. In this situation, the rotation of the cup body 10 may be realized by manual operation of the user. Compared with the electric device, the manual device is inconvenient in operation, but the rotary motor 32 can be omitted to simplify the structure and reduce the cost.

In order to improve the user experience, the cup body 10 is equipped with functional members 16, such as vibration motor, electric heater, and etc. These functional members 16 are used to provide functions, such as vibration, heating, and etc. The number and type of the functional members 16 may be configured according to the design requirements, and different types of functional members 16, such as vibration motor and electric heater, may be provided at the same time. Alternately, all of the functional members 16 may be the same type, such as all are vibration motors or electric heaters.

In this embodiment, as shown in FIGS. 1-6, the functional members 16 includes two vibration motors, one of which is arranged adjacent to an closed end of the inner chamber 12 and the other is arranged at around the inner chamber 12, thereby forming a three-dimensional vibration effect. The frequency and amplitude of the two vibration motors can be adjusted as required, which may be the same with or different from each other.

The cup holder 30 is equipped with a controller 36, such as a control circuit board. The controller 36 is electrically connected to the functional members 16 through a conductive structure 40, so that the operation of each functional member 16 can be controlled according to the user's instructions. In this embodiment, the controller 36 is also connected to the rotary motor 32 to facilitate the user to control the rotation of the rotary motor 32, and in turn control the rotation of the cup body 10. As shown in FIG. 3 and FIG. 4, an outer shell of the cup holder 30 is equipped with functional buttons 38, which are electrically connected to the controller 36, for inputting user's instructions to control the operation of the functional members 16, such as control the frequency and amplitude of the vibration motor, the heating temperature of the electric heater, and etc.

In some embodiments, the controller 36 includes a voice-activated unit, which can control the operation of the functional members 16 and the rotation of the cup body 10 according to user's voice instructions, further improving the convenience in use.

In some embodiments, the cup holder 30 is equipped with a battery 39. The battery 39 is electrically connected to the controller 36, and acts as a power source for supplying electric currents to the rotary motor 32 and the functional members 16. Preferably, the battery 39 is a rechargeable battery, and a corresponding charging port is provided in the outer shell of the cup holder 30 for connecting an external power supply to charge the battery 39.

Referring to FIG. 3 and FIG. 5, the conductive structure 40 includes a first conductive element 42 and a second conductive element 44 which are in contact with each other and are electrically conducted with each other. The first conductive element 42 is fixed relative to the cup holder 30 and electrically connected to the controller 36. The second conductive element 44 is fixed relative to the cup body 10 and electrically connected to the functional members 16. Since the cup body 10 is rotatable relative to the cup holder 30, the second conductive element 44 fixed to the cup body 10 is rotatable relative to the first conductive element 42 fixed to the cup holder 30.

At least one of the first and second conductive elements 44 is configured as conductive ring. A central axis of the conductive ring is coaxial with the rotation axis of the cup body 10 (i.e., the rotary shaft 34 of the rotary motor 32), so that the second conductive element 44 always keeps in contact with the first conductive element 42 during the rotation of the second conductive element 44 along with the cup body 10 relative to the cup holder 30 and the first conductive element 42, thereby maintaining the electrical connection between the controller 36 and the functional members 16.

The rotary masturbation apparatus of the present application is provided with a conductive structure 40 between the cup body 10 and the cup holder 30. The relative rotation path of the first conductive element 42 and the second conductive element 44 of the conductive structure 40 is a circumferential path, i.e., is the conductive ring. Therefore, the first conductive element 42 and the second conductive element 44 always keeps in contact with each other during relative rotation of them, so that the relative rotation members, such as the functional members 16 in the cup body 10 and the controller 36 in the cup holder 30, are capable of maintaining electrical connection therebetween, which effectively solves the electrical connection problem in the existing rotary masturbation devices caused by wire connection of relative rotation members.

It should be noted that there is no relative movement between the first conductive element 42 and the controller 36 mounted in the cup holder 30, and conventional connection means, such as wire connection, can be used to realize the electrical connection between the controller 36 and the first conductive element 42. Similarly, there is no relative movement between the second conductive element 44 and the functional members 16 mounted in the cup body 10, and the electrical connection therebetween may be realized through wire connection too, which can effectively simplify the structure and reduce the cost.

Figure 2:
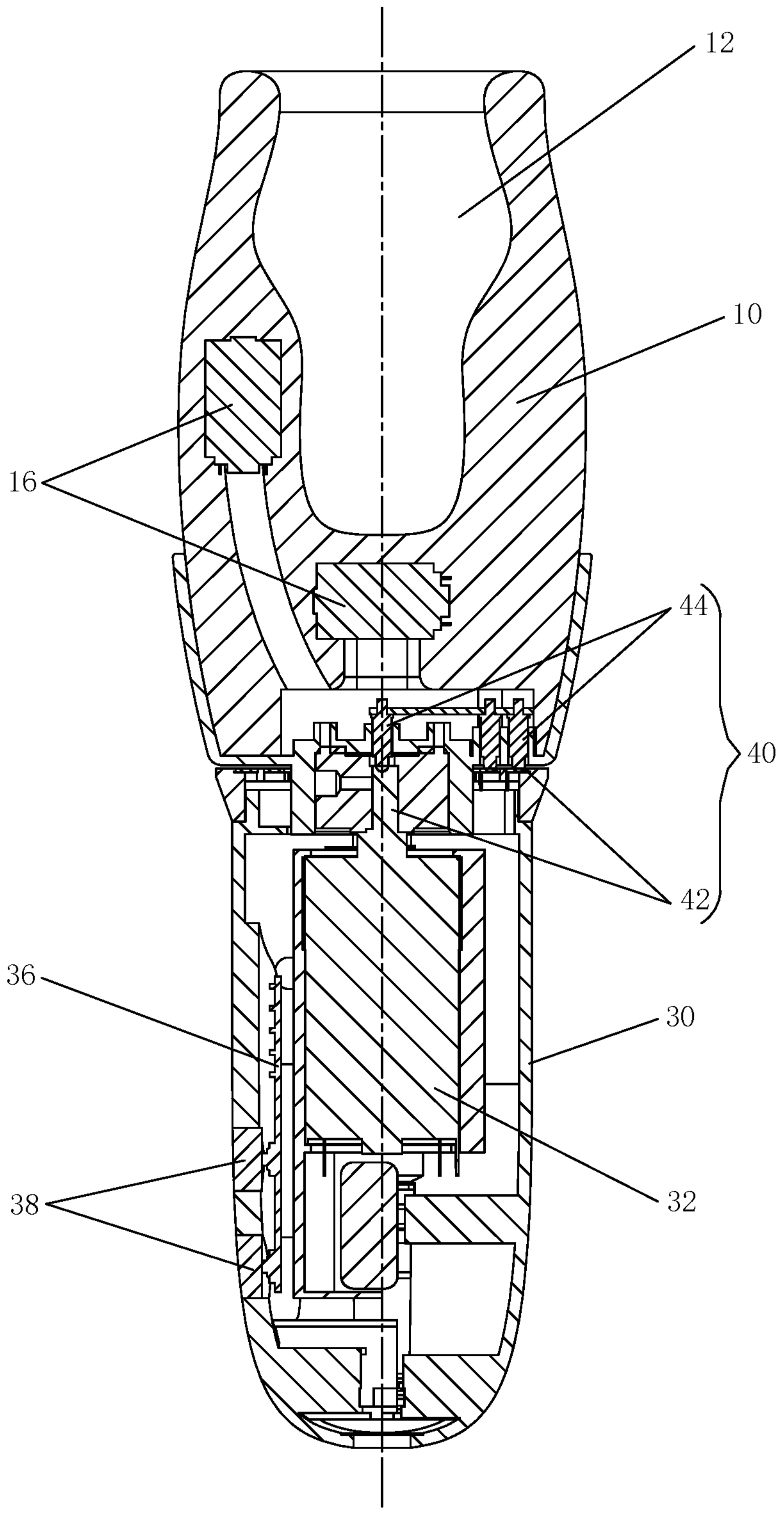
FIG. 2 is a cross sectional view of the rotary masturbation apparatus of FIG. 1 taken along line II-II.

In this embodiment, the first conductive element 42 is configured as conductive ring, and the second conductive element 44 is configured as conductive pin. The conductive pin 44 is arranged at an axial end of the conductive ring 42, and abuts the conductive ring 42 in the axial direction (as shown in FIG. 2). During the rotation of the cup body 10 relative to the cup holder 30, the conductive pin 44 slides along the conductive ring 42, and the contact therebetween is always maintained.

For each functional member 16, its positive and negative poles should be connected to different conductive pins 44, respectively. That is, the second conductive element 44 includes at least two conductive pins. Accordingly, the first conductive element 42 includes at least two conductive rings. Preferably, the number of conductive rings 42 is the same as that of conductive pins 44, and each of the conductive rings 42 contacts one of the conductive pins 44. As shown in FIG. 2, the conductive rings 42 are arranged at intervals in the radial direction, and the conductive pins 44 are arranged in a row in the radial direction and spaced from each other. Each conductive pin 44 is aligned with one of the conductive rings 42 in the axial direction.

In this embodiment, two functional members 16 are arranged in the cup body 10, the two positive poles of the two functional members 16 are respectively connected to two conductive pins 44, and the two negative poles of the two functional members 16 are connected to the same conductive pin 44, so the number of the conductive pins 44 is three. Accordingly, the number of conductive rings 42 is three. The positive poles of different functional members 16 are connected to different conductive pins 44/conductive rings 42 respectively, currents of different frequencies may be provided to different functional members 16, respectively. The negative poles of all of the functional members 16 are connected to the same conductive pin 44/conductive ring 42, which simplify the structure and save costs.

According to the above described connection method, the number of conductive pins 44/conductive rings 42 required may be determined according to the number of the functional members 16. If the number of functional members 16 is N, wherein N is an integer greater than zero, the number of the conductive pins 44/conductive rings 42 is N+1.

In some embodiments, different functional members 16 may be provided with the same current. In this situation, the positive poles of all of the functional members 16 may be connected to the same conductive pin 44/conductive ring 42. Therefore, no matter how many functional members 16 are, the number of conductive pins 44 and conductive rings 42 may be two.

In some embodiments, some of the functional members 16 may be provided with the same current, and some of the functional members 16 may be provided with different currents. In this situation, the positive poles of the functional members 16 requiring the same current may be connected to the same conductive pin 44/conductive ring 42, and the positive poles of the functional members 16 requiring different currents may be connected to different conductive pins 44/conductive rings 42, respectively.

In this embodiment, the conductive pins 44 are connected to the cup body 10 through a support frame 46. The support frame 46 is arranged at an end of the cup body 10 facing the cup holder 30. The support frame 46 and the cup body 10 may be fixedly connected by interference-fit, or may be integrally connected by injection molding. The conductive rings 42 are connected to an end of the cup holder 30 facing the cup body 10 through a fixing frame 48. The fixing frame 48 and the cup holder 30 may be connected by plugging, snap-fit, and etc.

Preferably, the fixing frame 48 defines a plurality of annular grooves 481 for receiving the conductive rings 42. The annular grooves 481 are arranged at intervals in the radial direction. The fixing frame 48 may be assembled with the conductive rings 42 after molding, or may be integrally connected to the conductive rings 42 during the injection molding. Preferably, a position slot 483 is concaved from a bottom of each annular groove 481, and a positon tab 43 extends from each of the conductive rings 42 into the corresponding position slot 483 to prevent relative rotation between the conductive rings 42 and the fixing frame 48.

In this embodiment, the rotary shaft 34 of the rotary motor 32 is made of conductive metal material, and acts as one of the conductive rings 42. Specifically, the rotary shaft 34, acting as the innermost conductive ring, is electrically connected to the negative poles of the functional members 16 through one corresponding conductive pin 44. The other two conductive rings 42 are received in the annular grooves 481 of the fixing frame 48 and arranged around the rotary shaft 34. These two other conductive rings 42 are electrically connected to the positive poles of the two functional members 16, respectively.

It should be understood that the rotary shaft 34 is generally a column-shaped structure with a certain diameter, and its cross section may be a solid ring or a hollow ring. In the illustrated embodiment, the cross section of an outer end of the rotary shaft 34 for outputting power is not a standard ring, specifically is generally "D" shaped, but as long as it has a certain radial width, it can form a circular moving path for the corresponding conductive pin 44 to keep them in contact with each other all the time, and thus it should be understood as a conductive ring.

In this embodiment, the motor housing 33 of the rotary motor 32 is made of conductive metal materials. One end of the rotary shaft 34 acts as a conductive ring and contacts the corresponding conductive pin 44, and the other end of the rotary shaft 34 contacts the motor housing 33 and is electrically conducted with the motor housing 33. In this situation, the motor housing 33 acts as an electrical connection path between the rotary shaft 34 and the controller 36. Preferably, a conductive terminal 331 protrudes outwardly form the motor housing 33, which may be connected to the controller 36 directly or through a wire, further simplifying the electrical connection between the rotary shaft 34 and the controller 36.

Referring to FIGS. 7-10, a rotary masturbation apparatus according to an alternative embodiment of the present application is shown.

The rotary masturbation apparatus of this embodiment includes a cup body 10 and a cup holder 30 which are rotatably connected together. The cup holder 30 is equipped with a rotary motor 32 to drive the cup body 10 to rotate relative to the cup holder 30. One or more functional members 16 are arranged in the cup body 10, and a controller 36 is arranged in the cup holder 30 to control the operation of the functional members 16. The controller 36 and the functional members 16 are electrically connected through a conductive structure 40.

The conductive structure 40 includes a first conductive element 42 and a second conductive element 44 which are in contact with each other and are electrically conducted with each other. The first conductive element 42 is fixed relative to the cup holder 30 and electrically connected to the controller 36 arranged in the cup holder 30, and the second conductive element 44 is fixed relative to the cup body 10 and electrically connected to the functional members 16 arranged in the cup body 10. At least one of the first and second conductive elements 42, 44 is configured as conductive ring.

Differently, in this embodiment, the first conductive element 42 is configured as conductive strips, and the second conductive element 44 is configured as conductive rings. The conductive strips 42 and conductive rings 44 both are three in number, and are used to connect two functional members 16. The conductive rings 44 are mounted around the rotary shaft 34 of the rotary motor 32 through a fixing frame 48, and are arranged at intervals in the axial direction of the rotary shaft 34. Preferably, the fixing frame 48 is provided with annular grooves 481 to accommodate the conductive rings 44. The conductive strips 42 are fixed in the cup holder 30 through a support frame 46, and are arranged at intervals in the axial direction.

Each conductive strip 42 contacts one of the conductive rings 44 in the radial direction, specifically contacts the outer circumferential surface of the corresponding conductive ring 44. During the rotation of the conductive ring 44 and the cup body 10 with the rotary shaft 34, the conductive ring 44 is in a stationary state relative to the cup body 10 and in a rotating state relative to the cup holder 30. The conductive strip 42 slides along the circumferential surface of the conductive ring 44. The conductive rings 44 and conductive strips 42 always maintain the contact and conduction state, finally maintaining the electrical connection between the controller 36 and the functional members 16.

In the above embodiments of this application, one of the first and second conductive elements 42, 44 of the conductive structure 40 is configured as conductive rings, and the other is configured as conductive pins or strips. Stable electrical connection between the first and second conductive elements 42, 44 during their relative rotation is realized through the ring-shaped structure, while reduction of the contact area and the friction of the first and second conductive elements 42, 44 during the relative rotation is ensured.

It should be understood that: the second conductive element 44 in the first embodiment may be configured as conductive strips, and the second conductive element 44 in the second embodiment may be configured as conductive pins. In addition, in some embodiments, both the first and second conductive elements 42, 44 may be configured as conductive rings, which are overlapped in the axial direction or sleeved in the radial direction, and can also maintain the electrical connection during the relative rotation.

In the first embodiment, both the first conductive element 42 and the second conductive element 44 of the conductive structure 40 are arranged in the radial direction, which can enlarge the radial size of the present rotary masturbation apparatus and reduce its axial size. In contrast, both the first conductive element 42 and the second conductive element 44 of the conductive structure 40 in the second embodiment are arranged in the axial direction, which can enlarge the axial size of the present rotary masturbation apparatus and reduce its radial size. The rotary masturbation apparatuses according to different embodiments have different advantages, which allows consumers to have more choices, so that they can choose products that are suitable for them, and then have a better use experience.

The rotary masturbation apparatus provided by the embodiments of the present application has a conductive structure 40 arranged between the cup body 10 and the cup holder 30, the first conductive element 42 and the second conductive element 42 of the conductive structure 40 are capable of maintaining the contact and conductive state therebetween, and in turn maintaining the electrical connection between the cup body 10 and the cup holder 30 which are rotate with respect to each other, so that various functional members 16 may be arranged in the cup body 10 to further improve the use experience, which is conducive to the development and promotion of the rotary masturbation apparatus.

The above merely provides the preferred embodiments of the present application, which is illustrative, rather than restrictive, to the present application. However, it should be understood by those skilled in the art that, many variations, modifications even substitutions that do not depart from the spirit and scope defined by the present application, shall fall into the extent of protection of the present application.

What is claimed is:

1. A rotary masturbation apparatus comprising:

a cup holder;

a rotatable cup body being rotatably connected to the cup holder, the rotatable cup body defining an inner chamber therein for accommodating male genitalia;

a rotary motor being arranged inside the cup holder with a rotary shaft thereof in transmission connection with the rotatable cup body;

at least one vibration motor being embedded in the rotatable cup body and rotatable together with the rotatable cup body; and a conductive structure being arranged between the cup holder and the rotatable cup body, the conductive structure comprising a first conductive element and a second conductive element which are in contact with each other and are electrically conducted with each other, the first conductive element being fixed relative to the cup holder, the second conductive element being fixed relative to the rotatable cup body and electrically connected to the at least one vibration motor, one of the first and second conductive elements being configured as a conductive ring, and the conductive ring being coaxial with the rotatable cup body;

wherein the second conductive element comprises a plurality of conductive rings, and the conductive rings are arranged at intervals in the radial direction or the axial direction;

wherein the first conductive element comprises a plurality of conductive pins or conductive strips, the number of the conductive pins or conductive strips is the same as that of the conductive rings, and each of conductive pins or conductive strips abut one of the conductive rings;

wherein the conductive rings are arranged at intervals in the axial direction, and the conductive pins or conductive strips abut the conductive rings radially; and wherein the conductive pins or conductive strips are fixed in the cup holder; and the conductive rings are fixedly mounted around the rotary shaft.

2. A rotary masturbation apparatus comprising:

a cup holder;

a cup body being rotatably connected to the cup holder, the cup body defining an inner chamber therein for accommodating male genitalia;

a rotary motor is arranged inside the cup holder with a rotary shaft thereof in transmission connection with the cup body; and a conductive structure being arranged between the cup holder and the cup body, the conductive structure comprising a first conductive element and a second conductive element which are in contact with each other and are electrically conducted with each other, the first conductive element being fixed relative to the cup holder, the second conductive element being fixed relative to the cup body, wherein the first conductive element comprises a plurality of conductive pins or conductive strips; and the second conductive element comprises a plurality of conductive rings, which are fixedly mounted around the rotary shaft and arranged at intervals in the axial direction.

3. The rotary masturbation apparatus according to claim 2, wherein the number of the conductive pins or conductive strips is the same as that of the conductive rings, and each of conductive pins or conductive strips abut one of the conductive rings radially.

4. The rotary masturbation apparatus according to claim 2, wherein the first conductive elements are conductive strips.

5. A rotary masturbation apparatus comprising:

a cup holder;

a cup body being rotatably connected to the cup holder, the cup body defining an inner chamber therein for accommodating male genitalia;

a rotary motor is arranged inside the cup holder with a rotary shaft thereof in transmission connection with the cup body; and a conductive structure being arranged between the cup holder and the cup body, the conductive structure comprising a first conductive element and a second conductive element which are in contact with each other and are electrically conducted with each other, the first conductive element being fixed relative to the cup holder, the second conductive element being fixed relative to the cup body, wherein the first conductive element comprises a plurality of conductive rings which are arranged around the rotary shaft at intervals in the radial direction, the rotary shaft of the rotary motor is conductive and acts as one of the conductive rings.

6. The rotary masturbation apparatus according to claim 5, wherein the second conductive element comprises a plurality of conductive pins or conductive strips; and the number of the conductive pins or conductive strips is the same as that of the conductive rings, and each of conductive pins or conductive strips abut one of the conductive rings radially.

7. The rotary masturbation apparatus according to claim 5, wherein the motor housing of the rotary motor is conductive, one end of the rotary shaft abuts one of the conductive pins or conductive strips to form electrical conduction therebetween, and the other end of the rotary shaft contacts the motor housing to form electrical conduction therebetween.

8. The rotary masturbation apparatus according to claim 7, wherein a conductive terminal protrudes outwardly from the motor housing.

* * * * *